(12) United States Patent
Manev et al.

(10) Patent No.: US 6,267,943 B1
(45) Date of Patent: Jul. 31, 2001

(54) LITHIUM MANGANESE OXIDE SPINEL COMPOUND AND METHOD OF PREPARING SAME

(75) Inventors: Vesselin Manev; Titus Faulkner, both of Gastonia; D. Wayne Barnette, Kings Mountain, all of NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/418,352

(22) Filed: Oct. 14, 1999

Related U.S. Application Data
(60) Provisional application No. 60/104,396, filed on Oct. 15, 1998, and provisional application No. 60/105,088, filed on Oct. 21, 1998.

(51) Int. Cl.[7] .............................. C01G 45/02; H01M 4/50; H01B 1/08

(52) U.S. Cl. ...................... 423/599; 429/224; 252/518.1

(58) Field of Search .............................. 252/518.1, 521.2; 423/599; 429/224

(56) References Cited

U.S. PATENT DOCUMENTS

| 4,246,253 | 1/1981 | Hunter . |
| 4,312,930 | 1/1982 | Hunter . |
| 4,497,726 | 2/1985 | Brule et al. . |
| 4,507,371 | 3/1985 | Thackeray et al. . |
| 4,546,058 | 10/1985 | Charkey et al. . |
| 4,668,595 | 5/1987 | Yoshino et al. . |
| 4,749,634 | 6/1988 | Sammells . |
| 4,828,834 | 5/1989 | Nagaura et al. . |
| 4,956,247 | 9/1990 | Miyazaki et al. . |

(List continued on next page.)

FOREIGN PATENT DOCUMENTS

| 0 712 172 A2 | 5/1996 | (EP) . |
| 44 35 117 C1 | 5/1996 | (DE) . |
| 0 717 455 | 6/1996 | (EP) . |

(List continued on next page.)

OTHER PUBLICATIONS

D. Gryffroy and R.E. Vandenberghe, Cation distribution, cluster structure and ionic ordering of the spinel series lithium nickel manganese titanium oxide (LiNi0.5Mn1.5–xTixO4) and lithium nickel magnesium manganese oxide (LiNi0.5–yMgyMn1.5O4); J.Phys. Chem. Solids (1992), 53(6), 777–84 (Abstract only).

D. Gryffroy; R.E. Vandenberghe; and D. Poelman; Optical absorption of nickel (Ni2+ (d8)) and manganese (Mn4+ (d3)) in some spinel oxides; Solid State Commun. (1992), 82(7), 497–500 (Abstract only).

(List continued on next page.)

Primary Examiner—Mark Kopec
(74) Attorney, Agent, or Firm—Alston & Bird LLP

(57) ABSTRACT

The present invention includes lithium manganese oxide spinel compounds having a low porosity, a high tap density and a high pellet density, and methods of preparing these compounds. In particular, the method comprises preparing a lithium manganese oxide with a spinel structure and having the formula: wherein:

$$Li_{1+X}Mn_{2-Y}M^1_{m_1}M^2_{m_2}\ldots M^k_{m_k}O_{4+Z}$$

$M^1, M^2, \ldots M^k$ are cations different than lithium or manganese selected from the group consisting of alkaline earth metals, transition metals, B, Al, Si, Ga and Ge;

$X, Y, m_1, m_2, \ldots, m_k$, each have a value between 0 and 0.2;

Z has a value between –0.1 and 0.2; and $X, Y, m_1, m_2, \ldots m_k$ are selected to satisfy the equation:

$$Y=X+m_1+m_2+\ldots +m_k.$$

17 Claims, 7 Drawing Sheets

U.S. PATENT DOCUMENTS

| | | |
|---|---|---|
| 4,959,282 | 9/1990 | Dahn et al. . |
| 4,975,346 | 12/1990 | Lecerf et al. . |
| 4,980,251 | 12/1990 | Thackeray et al. . |
| 5,028,500 | 7/1991 | Fong et al. . |
| 5,084,366 | 1/1992 | Toyoguchi . |
| 5,135,732 | 8/1992 | Barboux et al. . |
| 5,147,738 | 9/1992 | Toyoguchi . |
| 5,153,081 | 10/1992 | Thackeray et al. . |
| 5,160,712 | 11/1992 | Thackeray et al. . |
| 5,166,012 | 11/1992 | Rossouw et al. . |
| 5,169,736 | 12/1992 | Bittihn et al. . |
| 5,180,574 | 1/1993 | Von Sacken . |
| 5,196,278 | 3/1993 | Idota . |
| 5,211,933 | 5/1993 | Barboux et al. . |
| 5,240,794 | 8/1993 | Thackeray et al. . |
| 5,244,757 | 9/1993 | Takami et al. . |
| 5,264,201 | 11/1993 | Dahn et al. . |
| 5,266,299 | 11/1993 | Tarascon . |
| 5,286,582 | 2/1994 | Tahara et al. . |
| 5,294,499 | 3/1994 | Furukawa et al. . |
| 5,316,875 | 5/1994 | Murai et al. . |
| 5,316,877 | 5/1994 | Thackeray et al. . |
| 5,370,710 | 12/1994 | Nagaura et al. . |
| 5,370,949 | 12/1994 | Davidson et al. . |
| 5,425,932 | 6/1995 | Tarascon . |
| 5,429,890 | 7/1995 | Pynenburg et al. . |
| 5,443,929 | 8/1995 | Yamamoto et al. . |
| 5,449,577 | 9/1995 | Dahn et al. . |
| 5,478,671 | 12/1995 | Idota . |
| 5,478,673 | 12/1995 | Funatsu . |
| 5,478,674 | 12/1995 | Miyasaka . |
| 5,487,960 | 1/1996 | Tanaka . |
| 5,494,762 | 2/1996 | Isoyama et al. . |
| 5,496,664 | 3/1996 | Sterr . |
| 5,503,930 | 4/1996 | Maruyama et al. . |
| 5,506,077 | 4/1996 | Koksbang . |
| 5,518,842 | 5/1996 | Fey et al. . |
| 5,561,006 | 10/1996 | Lecerf et al. . |
| 5,589,300 | 12/1996 | Fauteux et al. . |
| 5,591,543 | 1/1997 | Peled et al. . |
| 5,595,842 | 1/1997 | Nakane et al. . |
| 5,604,057 | 2/1997 | Nazri . |
| 5,609,975 | 3/1997 | Hasegawa et al. . |
| 5,620,812 | 4/1997 | Tahara et al. . |
| 5,626,635 | 5/1997 | Yamaura et al. . |
| 5,631,105 | 5/1997 | Hasegawa et al. . |
| 5,648,057 | 7/1997 | Ueda et al. . |
| 5,658,693 | 8/1997 | Thackeray et al. . |
| 5,672,329 | 9/1997 | Okada et al. . |
| 5,672,446 | 9/1997 | Barker et al. . |
| 5,674,644 | 10/1997 | Nazri . |
| 5,674,645 | 10/1997 | Amatucci et al. . |
| 5,677,087 | 10/1997 | Amine et al. . |
| 5,679,481 | 10/1997 | Takanishi et al. . |
| 5,683,835 | 11/1997 | Bruce . |
| 5,686,203 | 11/1997 | Idota et al. . |
| 5,700,442 | 12/1997 | Bloch et al. . |
| 5,700,598 | 12/1997 | Denis et al. . |
| 5,702,679 | 12/1997 | Sheargold et al. . |
| 5,718,877 | 2/1998 | Manev et al. . |
| 5,718,989 | 2/1998 | Aoki et al. . |
| 5,742,070 | 4/1998 | Hayashi et al. . |
| 5,750,288 | 5/1998 | Xie et al. . |
| 5,759,717 | 6/1998 | Amine et al. . |
| 5,766,800 | 6/1998 | Manev et al. . |
| 5,783,332 | 7/1998 | Amine et al. . |
| 5,783,333 | 7/1998 | Mayer . |
| 5,789,115 | 8/1998 | Manev et al. . |
| 5,792,442 | 8/1998 | Manev et al. . |
| 5,795,558 | 8/1998 | Aoki et al. . |
| 5,807,646 | 9/1998 | Iwata et al. . |
| 5,820,790 | 10/1998 | Amine et al. . |
| 5,858,324 | 1/1999 | Dahn et al. . |
| 5,874,058 | 2/1999 | Sheargold et al. . |
| 5,879,654 | 3/1999 | van Ghemen et al. . |
| 5,900,385 | 5/1999 | Dahn et al. . |
| 5,958,624 | * 9/1999 | Frech et al. ..................... 429/231.95 |
| 5,961,949 | 10/1999 | Manev et al. . |
| 5,965,293 | 10/1999 | Idota et al. . |
| 6,017,654 | 1/2000 | Kumta et al. . |
| 6,040,089 | 3/2000 | Manev et al. . |
| 6,048,643 | 4/2000 | van Ghemen et al. . |
| 6,071,645 | 6/2000 | Biensan et al. . |
| 6,080,510 | 6/2000 | Hemmer et al. . |
| 6,114,064 | 9/2000 | Manev et al. . |

FOREIGN PATENT DOCUMENTS

| | | |
|---|---|---|
| 0 712 172 A3 | 7/1996 | (EP) . |
| 0 728 701 A1 | 8/1996 | (EP) . |
| 0 744 381 | 11/1996 | (EP) . |
| 0 797 263 A2 | 9/1997 | (EP) . |
| 0 840 386 | 5/1998 | (EP) . |
| 0 885 845 A1 | 12/1998 | (EP) . |
| 63210028 | 8/1988 | (JP) . |
| 3108261 | 5/1991 | (JP) . |
| 4345759 A2 | 1/1992 | (JP) . |
| 4329263 | 11/1992 | (JP) . |
| 6124707 | 5/1994 | (JP) . |
| 7114915 | 5/1995 | (JP) . |
| 7192721 | 7/1995 | (JP) . |
| 8264179 | 1/1996 | (JP) . |
| 8078004 | 3/1996 | (JP) . |
| 8138649 | 5/1996 | (JP) . |
| 8138669 | 5/1996 | (JP) . |
| 8250120 | 9/1996 | (JP) . |
| 8287914 | 11/1996 | (JP) . |
| 9007638 | 1/1997 | (JP) . |
| 9147859 | 6/1997 | (JP) . |
| 10001316 | 1/1998 | (JP) . |
| 10027611 | 1/1998 | (JP) . |
| 10214624 | 8/1998 | (JP) . |
| 10241691 | 9/1998 | (JP) . |
| 10297924 | 10/1998 | (JP) . |
| 11016573 | 1/1999 | (JP) . |
| WO 96/12676 | 5/1996 | (WO) . |
| WO 96/34423 | 10/1996 | (WO) . |

OTHER PUBLICATIONS

A. Van Der Ven, M.K. Aydinol, G. Ceder, G. Kresse and J. Hafner; First–principles investigation of phase stability in $Li_xCoO_2$; 1998 The American Physical Society, vol. 58, No. 6, pp. 2975–2987.

C. Pouillerie, L. Croguennec, Ph. Biensan, P. Willmann and C. Delmas; Synthesis and Characterization of New $LiNi_{1-y}Mg_yO_2$ Positive Electrode Materials for Lithium–Ion Batteries; Journal of The Electrochemical Society, 147 (6) pp. 2061–2069 (2000).

J.R. Dahn, E.W. Fuller, M. Obrovac and U. Von Sacken; Thermal stability of $Li_xCoO_2$, $Li_xNiO_2$ and $\lambda$–$MnO_2$ and consequences for the safety of Li–ion cells; Solid State Ionics 69, pp. 265–270 (1994).

T. Ohzuku, A. Ueda and M. Kouguchi; Synthesis and Characterization of $LiAl_{1/4}Ni_{3/4}O_2$ (R3m) for Lithium–Ion (Shuttlecock) Batteries; J. Electrochem. Soc., vol. 142, No. 12, pp. 4033–4039, Dec. 1995.

Momchilov et al.; Rechargeable lithium battery with spinel–related $MnO_2$ II. Optimization of the $LiMn_2O_4$ synthesis conditions; Journal of Power Sources, 41, pp. 305–314 (1993).

Thackeray et al.; Lithium Insertion into Manganese Spinels; Mat. Res. Bulletin, vol. 18, pp. 461–472, 1983.

Manev et al.; Rechargeable lithium battery with spinel–related $\lambda$–$MnO_2$ I. Synthesis of $\lambda$–$MnO_2$ for battery applications; Journal of Power Sources, 43–44, pp. 551–559 (1993).

W.F. Howard, Jr.; *The Chemistry of $LiMn_2O_4$ Formation*; Covalent Associates, Inc. No Pub. Date/No Pub. Info.

Jiang et al.; Preparation and Electrochemical Characterization of Micron–Sized Spinel $LiMn_2O_4$; Electrochem. Soc., vol. 143, No. 5, pp. 1591–1598; May 1996.

Gao et al.; Characterizing $Li_{1+x}Mn_{2-x}O_4$ for Li–ion Battery applications; 1046b Extended Abstracts; Abstract No. 77; Fall Meeting (1995) Oct. 8/13, St. Louis, Missouri.

Gao et al.; Synthesis and Characterization of $Li_{1-x}Mn_{2-x}O_4$ for Li–Ion Battery Applications; Journal of the Electrochemical Society 143 (1996) Jan., No. 1, pp. 100–114.

Gao et al.; Thermogravimetric analysis to determine the lithium to manganese atomic ration in $Li_{1+x}Mn_{2-x}O_4$; Applied Physics Letters, 66 (19) pp. 2487–2489, May 8, 1995.

Thackeray et al.; Spinel Electrodes from the Li–Mn–O System for Rechargeable Lithium Battery Applications; J. Electrochem. Soc., vol. 139, No. 2, pp. 363–366, Feb. 1992.

Rossouw et al.; Structural Aspects of Lithium–Manganese–Oxide Electrodes for Rechargeable Lithium Batteries; Mat. Res. Bulletin, vol. 25, pp. 173–182, 1990.

Pistoia et al.; Synthesis of an efficient $LiMn_2O_4$ for lithium–ion cells; Journal of Power Sources 58, pp. 135–138, 1996.

Guyomard et al.; Rechargeable $Li_{1+x}Mn_2O_4$/Carbon Cells with a New Electrolyte Composition; Journal of Electrochemical Society 140, No. 11, pp. 3071–3081, Nov. 1993.

Saidi et al.; A model lithium–ion system based on the insertin properties of the spinel phase $Li_xM_n2O_4$ (0<x>2); Journal of Power Sources 58, pp. 145–151, (1996).

Manev et al.; Rechargeable lithium battery with spinel–related $\lambda$–$MnO_2$ III. Scaling–up problems associated with $LiMn_2O_4$ synthesis; Journal of Power Sources 54, No. 2, pp. 323–328, Apr. 1995.

Krutzsch et al.; Uber das system $Li_{1-x,y}Cu_xMnRuO_4$; Journal of the Less–Common Metals, 124, pp. 155–164 (1986). (Abstract Only).

Krutzsch et al.; Spinelle IM System $Li_{1-2}Cu_2RhRu_{1-x}Mn_xO_4$; Journal of the Less–Common Metals, 132, pp. 37–42 (1987). (Abstract Only).

Reimers et al.; Structure and electrochemistry of $Li_xF_{ey}Ni_{1-y}O_2$; Solid State Ionics 61, pp. 335–344 (1993).

European Search Report, The Hague, Jan. 19, 2000.

Ceder et al., The stability of Orthorhombic and Monoclinic–Layered $LiMnO_2$, *Electrochemical and Solid–State Letters*, (1999), pp. 550–552, 2 (11).

Dahn et al., Structure and Electrochemistry of $Li_2Cr_xMn_{2-x}O_4$ for $1.0 \leq x \geq 1.5$, *J. Electrochem. Soc.*, Mar. 1998, pp. 851–859, vol. 145, No. 3.

Jang et al., Stabilization of $LiMnO_2$ Structure Type by $LiAlO_2$ Addition, *Electrochemical and Solid–State Letters*, (1998), pp. 13–16, 1 (1).

Wickham et al., Crystallographic and Magnetic Properties of Several Spinels Containing Trivalent JA–1044 Manganese, *J. Phys. Chem. Solids*, Pergamon Press 1958, pp. 351–360, vol. 7.

De Kock et al., The effect of multivalent cation dopants on lithium manganese spinel cathodes, *Journal of Power Sources*, vol. 70, Issue 2, Feb. 1998, pp. 247–252.

Gummow et al., Improved capacity retention in rechargeable 4 V lithium/lithium–manganese oxide (spinel) cells, *Solid State Ionics*, (1994).

Tarascon et al., The Spinal Phase of $LiMn_2O_4$ as a Cathode in Secondary Lithium Cells, *J. Electrochem. Soc.*, Oct. 1991, vol. 138, No. 10, pp. 2859–2864.

Padhi et al., Ambient and High–Pressure Structures of $LiMnVO_4$ and Its $Mn^{3+}/Mn^{2+}$ Redox Energy, *Journal of Solid State Chemistry*, (1997), 128, Article No. SC967217, pp. 267–272.

Amine et al., Preparation and Electrochemical Investigation of $LiMn_{1.5}Me_{0.5}O_4$ (Me:Ni,Fe) Cathode Materials For Secondary Lithium Batteries, Fundamental Technology Laboratory, Corporate R&D Center, Japan Storage Battery Co., Ltd. 11–B–34 No Pub Date/Info.

Amine et al., Preparation and electrochemical investigation of $LiMn_{2-x}Me_xO_4$ (Me: Ni, Fe, and x=0.5, 1) cathode materials for secondary lithium batteries, *Journal of Power Sources*, 68, (1997), pp. 604–608.

Pistoia et al., Doped Li–Mn Spinels: Physical/Chemical Characteristics and Electrochemical Performance in Li Batteries, *American Chemical Society*, 9, (1997), pp. 1443–1450.

Suzuki et al., Valence Analysis of Transition Metal Ions in Spinel LiMnMO4 (M = Ti, Cr, Mn, Co) by Electron Energy Loss Spectroscopy, *J. Phys. Chem. Solids*, (1996), vol. 57, No. 12, pp. 1851–1856.

Rossen et al., Structure and electrochemistry of $Li_xMn_yNi_{1-y}O_2$, *Solid State Ionics*, (1992), pp. 311–318.

Banov et al., Lithium Manganese Cobalt Spinel Cathode for 4V Lithium Batteries, $8^{th}$ International Meeting on Lithium Batteries, Jun. 16–21, 1996, Nagoya Japan, pp. 452–453.

Moshtev et al., Chemically Desodiated Thiochromites as Cathode Materials in Secondary Lithium Cells, *Journal of Power Sources*, 26, (1989), pp. 285–292.

Hernan et al., Use of Li–M–Mn–O [M = Co, Cr, Tr] spinels prepared by a sol–gel method as cathodes in high–voltage lithium batteries, *Solid State Ionics*, 118, (1999) pp. 179–185.

Armstrong et al., Synthesis of layered LiMnO2 as an electrode for rechargeable lithium batteries, *Nature*, (Jun. 6, 1996), vol. 381, pp. 499–500.

* cited by examiner $LiMn_2O_4$ from $Mn_2O_3$ via $\beta\text{-}MnO_2$

$LiMn_2O_4$ from $MnCO_3$

LiMn2O4 from χ-MnO$_2$ (EMD)

LITHIUM MANGANESE OXIDE SPINEL COMPOUND AND METHOD OF PREPARING SAME

CROSS-REFERENCE TO RELATED APPLICATIONS

This application claims the benefit of U.S. Provisional Application Serial No. 60/104,396, filed Oct. 15, 1998, and U.S. Provisional Application Serial No. 60/105,088, filed Oct. 21, 1998, under 35 U.S.C. § 119(e).

FIELD OF THE INVENTION

This invention relates to lithiated metal oxide intercalation compounds, and particularly to lithium manganese oxides with spinel structures for positive electrodes in 4 V secondary lithium and lithium-ion batteries.

BACKGROUND OF THE INVENTION

Lithium manganese oxide spinel compounds such as $Li_{1+X}Mn_{2-X}O_{4+Y}$ have been used as positive electrode material for 4 V secondary lithium and lithium-ion batteries. Typically, these spinel compounds are formed by firing (calcining) a mixture of a manganese source compound and a lithium source compound.

Exemplary manganese source compounds include manganese carbonate ($MnCO_3$), electrochemical manganese dioxide ($\gamma$-$MnO_2$ or EMD), and chemical manganese dioxide ($\gamma$-$MnO_2$ or CMD).

As described in coassigned U.S. Pat. No. 5,789,115, the mean particle size and particle size distribution of these compounds and, in particular, $Li_{1+X}Mn_{2-X}O_{4+Y}$, is dependent on the mean particle size and particle size distribution of the raw materials used to make these compounds and specifically the manganese source compound. In addition to affecting the particle size and particle size distribution of the lithium manganese oxide, the morphology, e.g., density and porosity, of the manganese source compound can affect the morphology of the resulting lithium manganese oxides. In particular, the crystal growth of the spinel phase using a low density manganese compound causes an increase in the distance between the spinel crystallites and has a negative effect on the final density of the spinel compound. This presents a problem with $MnCO_3$ and CMD because these manganese source compounds have relatively low densities and thus produce a low density product. Because EMD has a higher density than $MnCO_3$ and CMD, EMD is often used instead of these manganese source compounds to produce spinel compounds. Nevertheless, the combined water, porosity and vacancies in the EMD structure have a negative effect on the density of the resulting spinel compound.

The morphology of the manganese source compound also affects the tap and pellet density of the spinel compound. The tap and pellet density are important properties characterizing positive electrode materials for secondary lithium and lithium-ion batteries. In particular, these properties directly influence the specific cell energy, cell safety performance, manganese dissolution, capacity fade and capacity loss at room and elevated temperatures, for the electrochemical cell. Therefore, providing a method for preparing lithium manganese oxide spinel compounds having a desired tap and pellet density is of great importance in developing high energy density and high electrochemical performance 4 V secondary lithium and lithium ion batteries.

SUMMARY OF THE INVENTION

The present invention is directed to lithium manganese oxide spinel compounds having a low porosity, a high tap density and a high pellet density, and a method of preparing these compounds. In particular, the method comprises preparing a lithium manganese oxide with a spinel structure and having the formula:

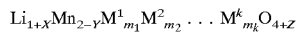

$$Li_{1+X}Mn_{2-Y}M^1{}_{m_1}M^2{}_{m_2}\ldots M^k{}_{m_k}O_{4+Z}$$

wherein:

$M^1, M^2, \ldots M^k$ are cations different than lithium or manganese selected from the group consisting of alkaline earth metals, transition metals, B, Al, Si, Ga and Ge;

X, Y, $m_1, m_2, \ldots m_k$ are molar parts, each having a value between 0 and 0.2;

Z is a molar part having a value between −0.1 and 0.2; and the molar parts X, Y, $m_1, m_2, \ldots m_k$ are selected to satisfy the equation:

$$Y = X + m_1 + m_2 + \ldots + m_k$$

These lithium manganese oxide compounds are produced by calcining a mixture comprising at least one manganese oxide (manganese source compound) selected from the group consisting of $Mn_2O_3$ or $Mn_3O_4$, at least one lithium compound, and optionally at least one $M^1, M^2, \ldots M^k$ source compound, in at least one firing step at a temperature between about 400° C. and about 900° C.

The manganese oxide compounds can be formed by firing highly crystalline $\beta$-$MnO_2$ at a temperature between about 500° C. and 1000° C. Preferably, the $\beta$-$MnO_2$ is fired at a temperature between about 600° C. and about 800° C. in the preparing step to form $Mn_2O_3$ manganese oxide. The highly crystalline $\beta$-$MnO_2$ used to produce the $Mn_2O_3$ or $Mn_3O_4$ is preferably formed by firing $Mn(NO_3)_2$ at a temperature between about 200° C. and about 400° C. to thermally decompose the $Mn(NO_3)_2$ and form $\beta$-$MnO_2$. In addition, the $\beta$-$MnO_2$ preferably has a mean particle size of between about 5 $\mu$m and about 20 $\mu$m and can be ground to produce this mean particle size.

In the calcining step, the mixture of source compounds is fired at between about 400° C. and about 900° C. Preferably, the mixture is calcined using more than one firing step at firing temperatures within this temperature range. During calcination, agglomeration of the spinel particles is preferably prevented. For example, during a multiple step firing sequence, agglomeration can be prevented by firing the source compounds in a fluid bed furnace or rotary calciner during at least a portion of the firing steps or by grinding the spinel material between steps. The lithium manganese oxide spinel compounds of the invention can be used as positive electrode material for a secondary lithium or lithium-ion electrochemical cell.

The lithium manganese oxide spinel compounds of the invention have a high tap density and pellet density and a low porosity and specific area. In addition, these compounds have a high specific capacity, low capacity fade during cycling, and a low capacity loss during storage at room and elevated temperatures. In particular, the spinel compounds of the invention have a tap density of greater than 1.9 g/cm³ and preferably greater than 2.1 g/cm³. The pellet density for those spinel compounds is greater than 2.85 g/cm³, preferably greater than 2.90 g/cm³, or even greater than 2.95 g/cm³. The pore volume of the pores having a mean radius of less than 1 micron in the spinel compound is no more than 20%, preferably no more than 15% or even no more than 10%, of the total pore volume of the spinel compound, thus illustrating the low porosity of the spinel compound. In addition, the specific area of the spinel compound is less than about 0.8 m$^2$/g and preferably less than 0.6 m$^2$/g or even less than 0.5 m$^2$/g.

The present invention also includes the $Mn_2O_3$ and $Mn_3O_4$ manganese oxide compounds used to produce the spinel compounds of the invention. These manganese oxide compounds are highly crystalline and have a low porosity. In particular, these manganese oxide compounds have a porosity such that the pore volume of pores having a mean radius of less than 1 micron in said manganese oxide is no more than 20% of the total pore volume of said manganese oxide. These manganese oxides also have a specific area of less than 2.0 m$^2$/g, preferably less than 1.5 m$^2$/g or even less than 1.0 m$^2$/g. The tap density of the manganese oxides is preferably greater than 2.2 g/cm$^3$, more preferably greater than 2.4 g/cm$^3$.

These and other features and advantages of the present invention will become more readily apparent to those skilled in the art upon consideration of the following detailed description and accompanying drawings which describe both the preferred and alternative embodiments of the present invention.

BRIEF DESCRIPTION OF THE DRAWINGS

This invention may be better understood and its numerous objects and advantages will become apparent to those skilled in the art by reference to the accompanying drawings and photographs as follows.

DETAILED DESCRIPTION OF THE PREFERRED EMBODIMENTS

As will be understood by those skilled in the at in reading this application, the term "lithium manganese oxide" includes not only compounds that include only lithium, mananganese and oxygen, but also compounds that include dopants such as alkaline earth metals, transition metals, B, Al, Si, Ga and Ge.

Figure 1:
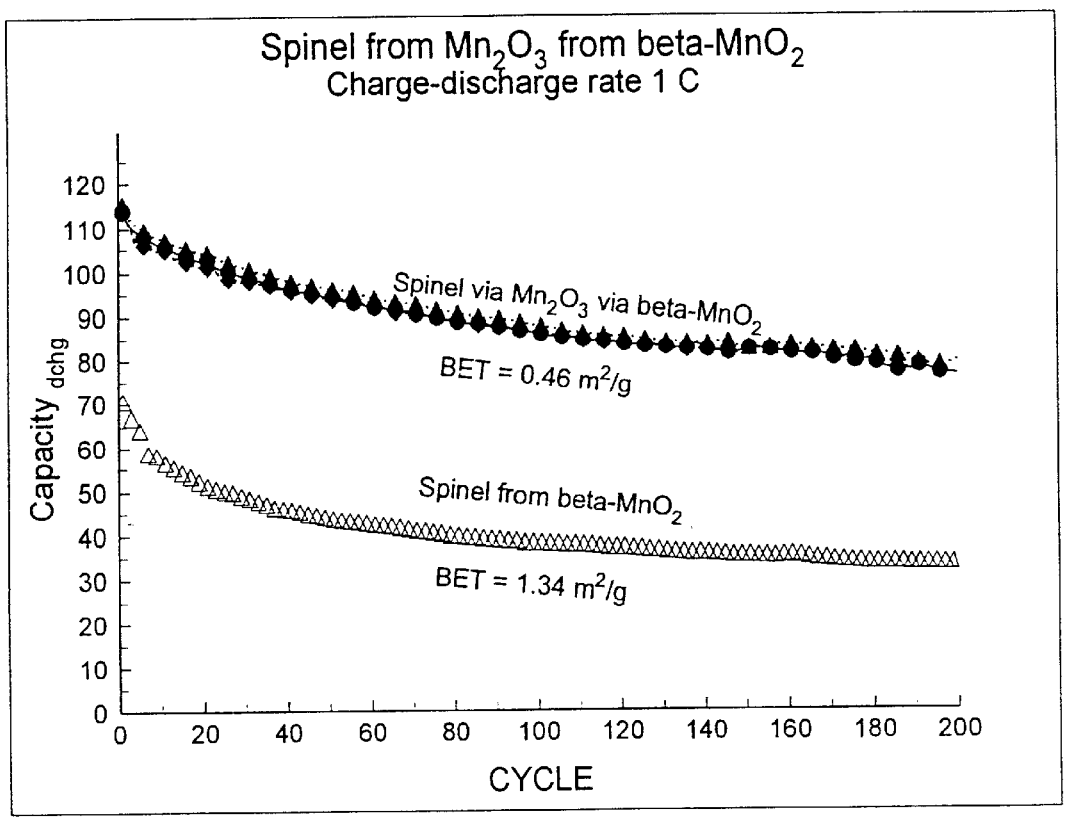
FIG. 1 is a graph of specific capacity v. charge-discharge cycles for $Li_{1.04}Mn_{1.96}O_4$ spinel compounds and compares the specific capacity and cycleability of spinel compounds prepared directly from β-$MnO_2$ and prepared according to the present invention using a $Mn_2O_3$ precursor obtained from β-$MnO_2$.

It has been unexpectedly discovered in accordance with the invention that using $Mn_2O_3$ or $Mn_3O_4$, preferably formed from β-$MnO_2$, to produce lithium manganese oxide spinel compounds can produce spinel compounds having good electrochemical performance and excellent pellet and tap densities. In particular, β-$MnO_2$, $Mn_2O_3$, and $Mn_3O_4$ are known in the art as being chemically inactive with lithium salts. For example, as shown in FIG. 1, lithium manganese oxide spinels formed directly from β-$MnO_2$ have extremely poor electrochemical performance. However, it has been discovered that by using highly crystalline $Mn_2O_3$ or $Mn_3O_4$ prepared, e.g., using highly crystalline β-$MnO_2$, a high density manganese oxide can be obtained having a high chemical activity. The highly crystalline β-$MnO_2$ used in the invention is not porous and thus has a greater density than $MnCO_3$, CMD and EMD. Furthermore, the β-$MnO_2$ has no combined water and has a highly ordered structure. Therefore, as shown in FIG. 1, using β-$MnO_2$ to form a manganese precursor for lithium manganese oxide preparation leads to a product with dramatically better electrochemical performance than using β-$MnO_2$ directly.

As stated above, the β-$MnO_2$ preferably used to prepare the $Mn_2O_3$ and $Mn_3O_4$ manganese oxides is a highly crystalline β-$MnO_2$. The high crystallinity of the β-$MnO_2$ can be determined by measuring peak-widths using x-ray diffraction. An exemplary highly crystalline β-$MnO_2$ can be formed by firing $Mn(NO_3)_2$ at a temperature between about 200° C. and about 400° C. to thermally decompose the $Mn(NO_3)_2$ and form β-$MnO_2$. The β-$MnO_2$ is fired at a temperature between about 500° C and about 1000° C. to produce $Mn_2O_3$ or $Mn_3O_4$. Preferably, the β-$MnO_2$ is fired at a temperature between about 600° C. and about 800° C. to form $Mn_2O_3$. In addition, the β-$MnO_2$ is preferably fired for between about 1 hour and 10 hours to produce these manganese oxides but can be fired for a longer period of time without negative effects. The β-$MnO_2$ preferably has a mean particle size of between about 5 μm and 20 μm prior to forming the manganese oxides and can be ground to this mean particle size prior to firing.

In one embodiment of the invention, the β-$MnO_2$ is fired at a starting temperature of about 500° C. and the temperature slowly raised (e.g. at a rate of less than about 1° C./min) to a final temperature between about 600° C. and about 650° C. to thermally decompose the β-$MnO_2$ to form $Mn_2O_3$. By slowly raising the temperature, a $Mn_2O_3$ compound with an even better density and chemical activity is obtained.

The $Mn_2O_3$ or $Mn_3O_4$ manganese oxides resulting from firing β-$MnO_2$ have a tap density of greater than 2.2 g/cm$^3$ and preferably greater than 2.4 g/cm$^3$. In addition, the particle size of the $Mn_2O_3$ or $Mn_3O_4$ is typically between about 1.1 and 1.3 times the size of the β-$MnO_2$, i.e., between about 6 μm and 25 μm. The specific area of the $Mn_2O_3$ or $Mn_3O_4$ is less than 2.0 m$^2$/g and preferably less than 1.5 m$^2$/g, or even less than 1.0 m$^2$/g (as determined by one point BET). These manganese oxides also preferably have high crystallinity and low porosity. In particular, the porosity of these manganese oxides is preferably such that the pore volume of the pores having a mean radius of less than 1 micron is no more than 20%, preferably no more than 15% or even no more than 10% of the total pore volume of the manganese oxide using Mercury porosimetry. In addition to using highly crystalline $Mn_2O_3$ or $Mn_3O_4$ formed from β$MnO_2$, highly crystalline $Mn_2O_3$ or $Mn_3O_4$ prepared by other methods and having the above properties can also be used in the present invention.

The $Mn_2O_3$ or $Mn_3O_4$ is combined with lithium source compounds and optionally dopant ($M^1, M^2, \ldots M^k$) source compounds to produce a stoichiometric mixture according to the formula:

$$Li_{1+X}Mn_{2-Y}M^1_{m_1}M^2_{m_2}\ldots M^k_{m_k}O_{4+Z}$$

wherein:

$M^1, M^2, \ldots M^k$ are cations different than lithium or manganese selected from the group consisting of alkaline earth metals, transition metals, B, Al, Si, Ga and Ge;

X, Y, $m_1, m_2, \ldots m_k$ are molar parts, each having a value between 0 and 0.2;

Z is a molar part having a value between −0.1 and 0.2; and the molar parts X, Y, $m_1, m_2, \ldots m_k$ are selected to satisfy the equation:

$$Y = X + m_1 + m_2 + \ldots m_k$$

The lithium and dopant source compounds can be pure elements but are typically compounds containing the elements such as oxides or salts thereof. In addition, the lithium and dopant cations can each be supplied from separate source compounds or two or more of the cations can be supplied from the same source compounds. Preferably, the lithium source compounds include one or any combination of the following: LiOH, $LiNO_3$, $Li_2CO_3$, LiCl and LiF. The manganese oxide and lithium and dopant source compounds can be mixed in any desirable order. In addition, although the spinel compounds are preferably prepared by solid state reactions, it can be advantageous to react the raw materials using wet chemistry alone or in combination with solid state reactions. For example, the reaction mixture can be prepared by suspending source compounds in a solution of other source compounds and spray drying the resulting slurry to obtain an intimate mixture.

The mixture of the manganese oxide and lithium and dopant source compounds can be calcined in a solid state reaction to form a lithium manganese oxide with a spinel structure by firing the mixture in at least one firing step at a temperature between about 400° C. and about 900° C. in the presence of oxygen, e.g., in an atmosphere having an oxygen partial pressure of at least 10 kPa. Exemplary firing sequences are disclosed, e.g., in coassigned U.S. Pat. Nos. 5,718,877 and 5,792,442. Preferably, the mixture is calcined using more than one firing step at firing temperatures between about 450° C. and 850° C. and for a total firing time between about 4 and about 48 hours to form the spinel compounds. The mixture can also be fired for a longer period of time without negatively affecting the resulting product. Once the mixture has been fired to form the lithium manganese oxide spinel compound, the resulting compound is preferably cooled to ambient temperature in a controlled manner, e.g., at a rate of 1° C./min or less.

It has been discovered that agglomeration of the spinel particles occurs during spinel phase nucleation in the calcination step, e.g., during the initial firing step of a multiple step firing sequence. This agglomeration is preferably prevented by suitable means to produce spinel particles having a mean particle size between about 7 μm and about 30 μm. For example, agglomeration can be prevented by firing the mixture during at least the initial firing steps in a fluid bed furnace or rotary calciner to minimize the contact between the particles in the mixture. The spinel particles can also be ground to the desired particle size between firing steps, especially between the initial firing steps, to prevent agglomeration.

The resulting lithium manganese oxide spinel compounds have high tap and pellet densities. Preferably, these tap and pellet densities can be improved by mildly dispersing the resulting lithium manganese oxide spinel compounds in an unreactive solvent such as acetone. Alternatively, the spinel compound can be dispersed in a dry mixture by placing the compound in a mixer for a short period of time, e.g., 1 to 60 minutes.

The present invention also includes a lithium manganese oxide spinel compound having the formula:

$$Li_{1+X}Mn_{2-Y}M^1_{m_1}M^2_{m_2}\ldots M^k_{m_k}O_{4+Z}$$

wherein:

$M^1, M^2, \ldots M^k$ are cations different than lithium or manganese selected from the group consisting of alkaline earth metals, transition metals, B, Al, Si, Ga and Ge;

X, Y, $m_1, m_2, \ldots m_k$ are molar parts, each having a value between 0 and 0.2;

Z is a molar part having a value between −0.1 and 0.2; and the molar parts X, Y, $m_1, m_2, \ldots m_k$ are selected to satisfy the equation:

$$Y = X + m_1 + m_2 + \ldots + m_k$$

Figure 2:
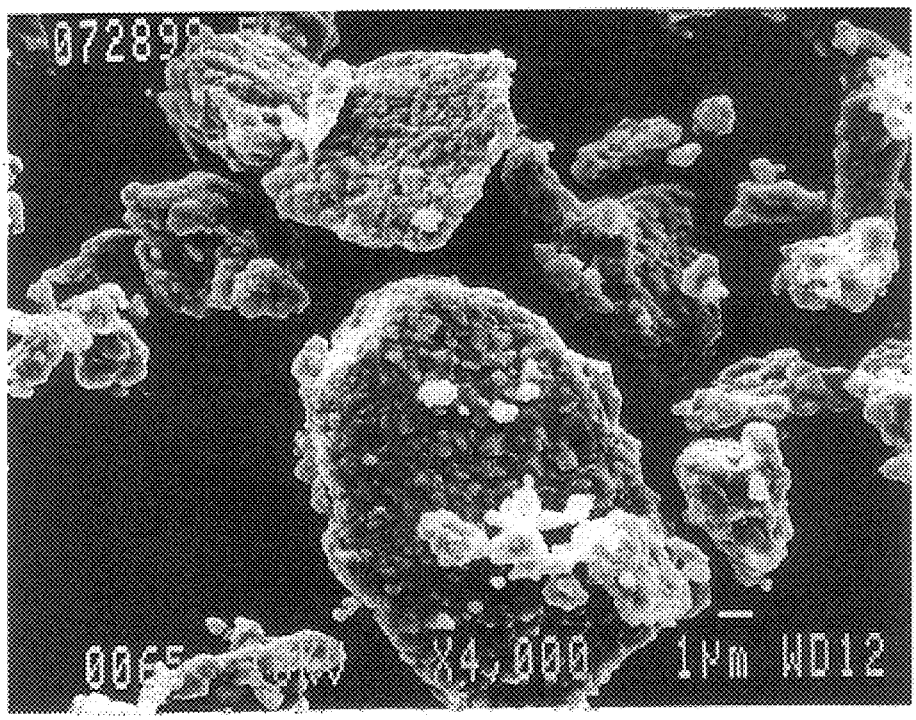
FIGS. 2A and 2B are SEM photographs of lithium manganese oxide spinel compounds prepared from a $Mn_2O_3$ precursor obtained from β-$MnO_2$ according to the present invention and demonstrating the dense structure of the spinel compounds of the invention.
Figure 2:
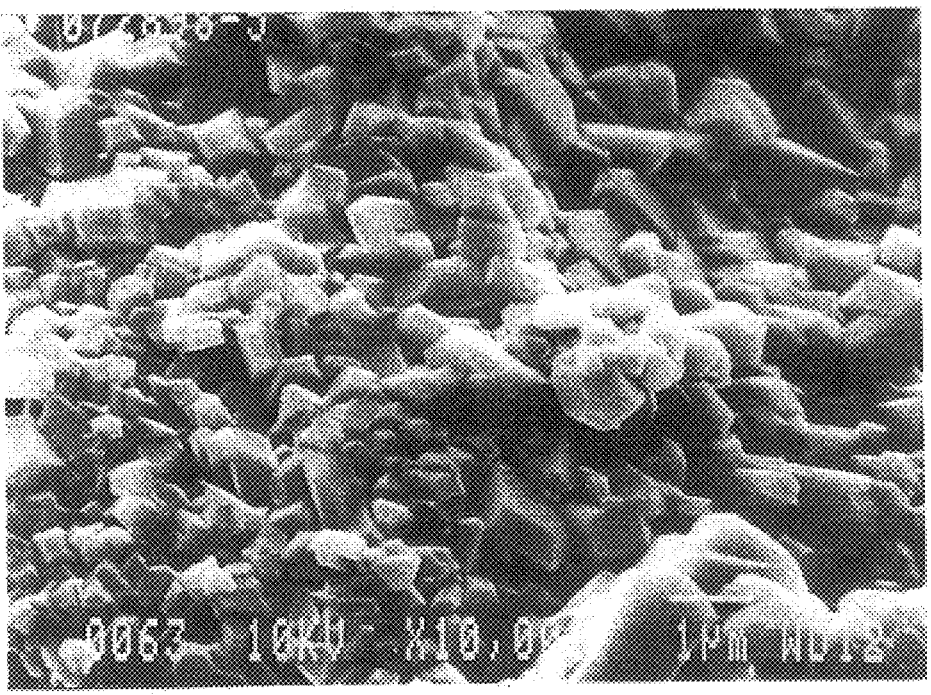
Figure 3:
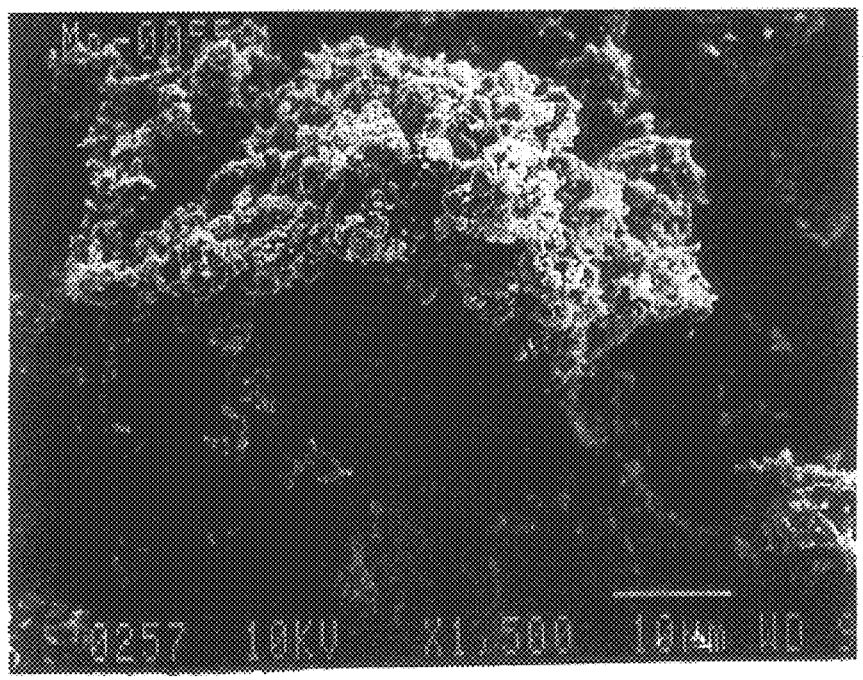
FIGS. 3A and 3B are scanning electron microscope (SEM) photographs of a spinel compound prepared from $MnCO_3$ by calcination at 825° C.
Figure 3:
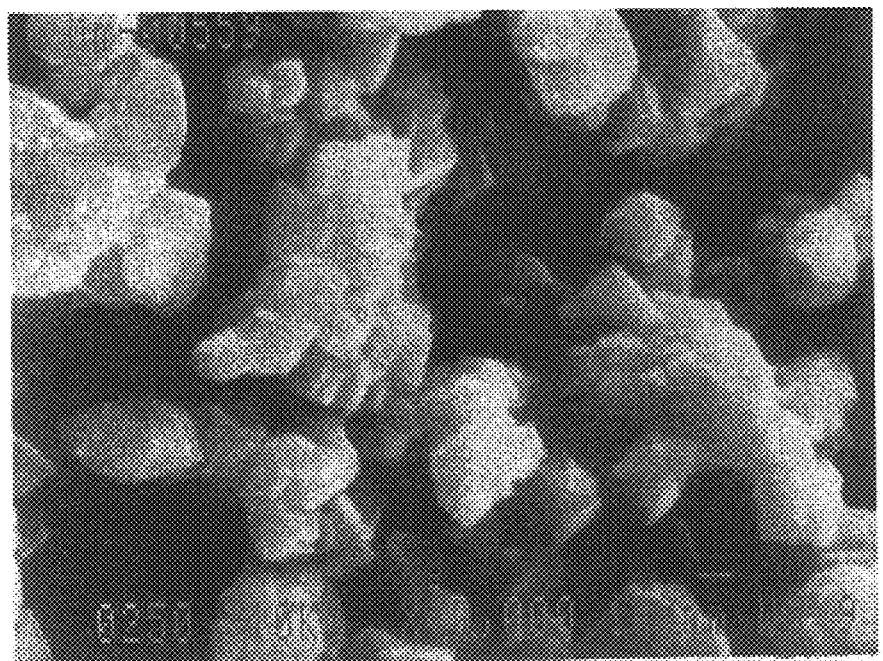
Figure 4:
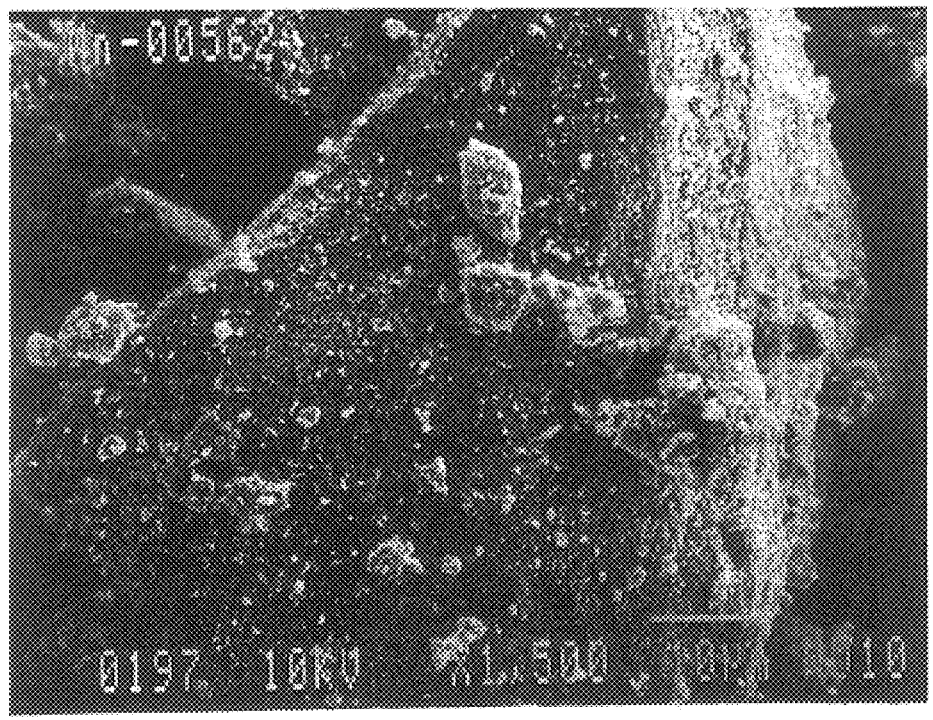
FIGS. 4A and 4B are SEM photographs of a spinel compound prepared from γ-$MnO_2$ (EMD) by calcination at 750° C.
Figure 4:
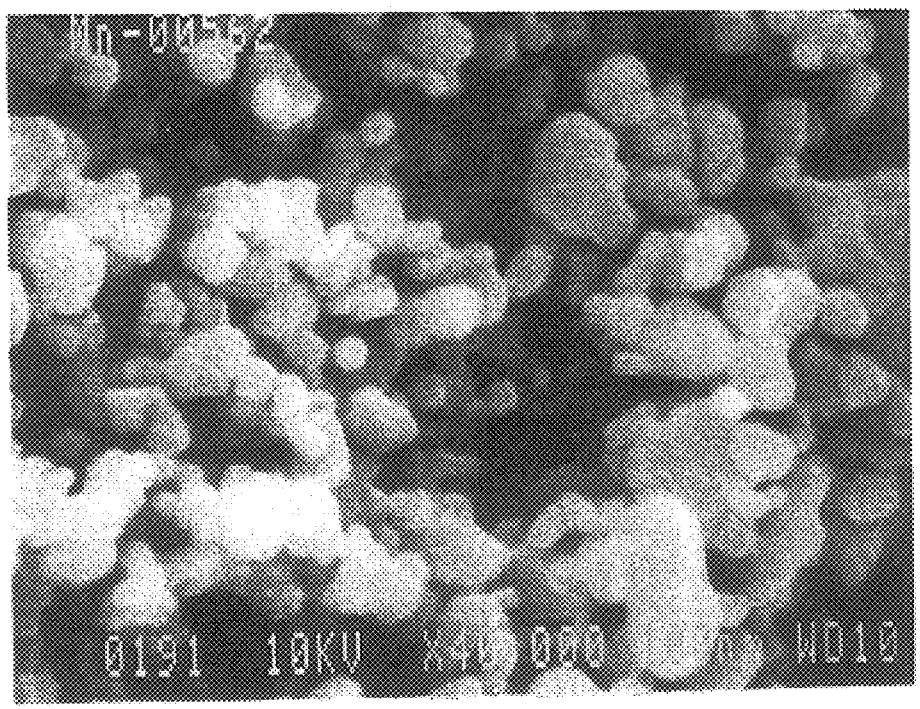
Figure 5:
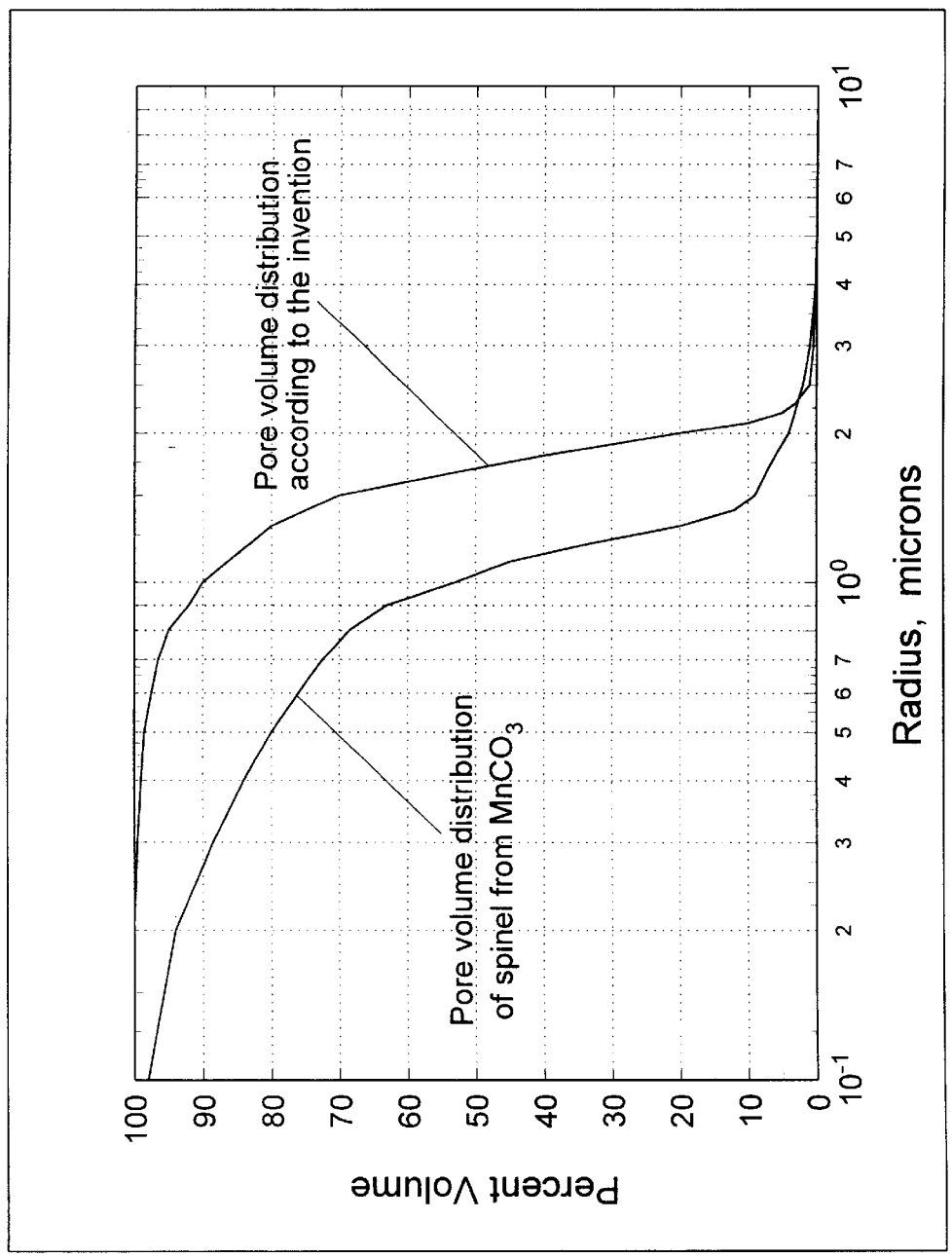
FIG. 5 is a graph illustrating the integral porosity as a function of pore radius of spinel compounds of the invention compared to the integral porosity of spinel compounds produced from $MnCO_3$.

As shown in FIGS. 2A and 2B, the spinel compounds of the invention have low porosity and high density, especially compared to spinel compounds prepared from $MnCO_3$ (FIGS. 3A and 3B) and EMD (FIGS. 4A and 4B). In addition, FIG. 5 illustrates that the porosity of a spinel compound prepared according to the invention is significantly lower than the porosity of a spinel compound prepared from $MnCO_3$ as measured using Mercury porosimetry. In particular, FIG. 5 illustrates that the pore size and pore size distribution of a spinel compound prepared according to the invention is such that the pore volume of pores having a mean radius of less than 1 micron is about 10% of the pore volume of the spinel compound. The pore size and pore size distribution of a spinel compound prepared from $MnCO_3$, on the other hand, is such that the pore volume of the pores with a mean radius of less than 1 micron is about 45% of the total pore volume of the spinel compound. Because the volume of micropores (pores of less than 1 micron between the crystallites within the particles) is significantly less than the volume of macropores (pores of greater than 1 micron between the particles), the spinel compounds of the invention have a low porosity and thus have a high tap and pellet density compared, e.g., to spinel compounds prepared from $MnCO_3$.

Specifically, the spinel compounds of the invention have a tap density of greater than 1.9 g/cm³, preferably greater than 2.1 g/cm³. In addition, the spinel compounds of the invention preferably have a pellet density of greater than about 2.85 g/cm³ and more preferably greater than 2.90 g/cm³, or even greater than 2.95 g/cm³. As is understood by those skilled in the art, the tap density is measured according to the method described in detail in the Handbook of Manganese Dioxides (1989) published by the International Battery Material Association. The pellet density is the measured density at 20,000 psi.

In addition to these properties, the porosity of the spinel compounds of the invention is such that the pore volume of the pores having a mean radius of less than 1 micron is no more than 20% and preferably no more than 15% or even no more than 10%, of the total pore volume of the spinel compound using Mercury porosimetry. These compounds also have a specific area of less than about 0.8 m²/g, preferably less than about 0.6 m²/g, or even less than about 0.5 m²/g using a one point BET method. The mean particle size of the spinel compound of the invention is preferably between 7 μm and 30 μm. These compounds also are single phase compounds and preferably have a full width at half maximum of x-ray diffraction peaks from planes (400) and (440) using CuKα rays of less than about 0.15° 2θ, and more preferably less than or equal to 0.125° 2θ.

Figure 6:
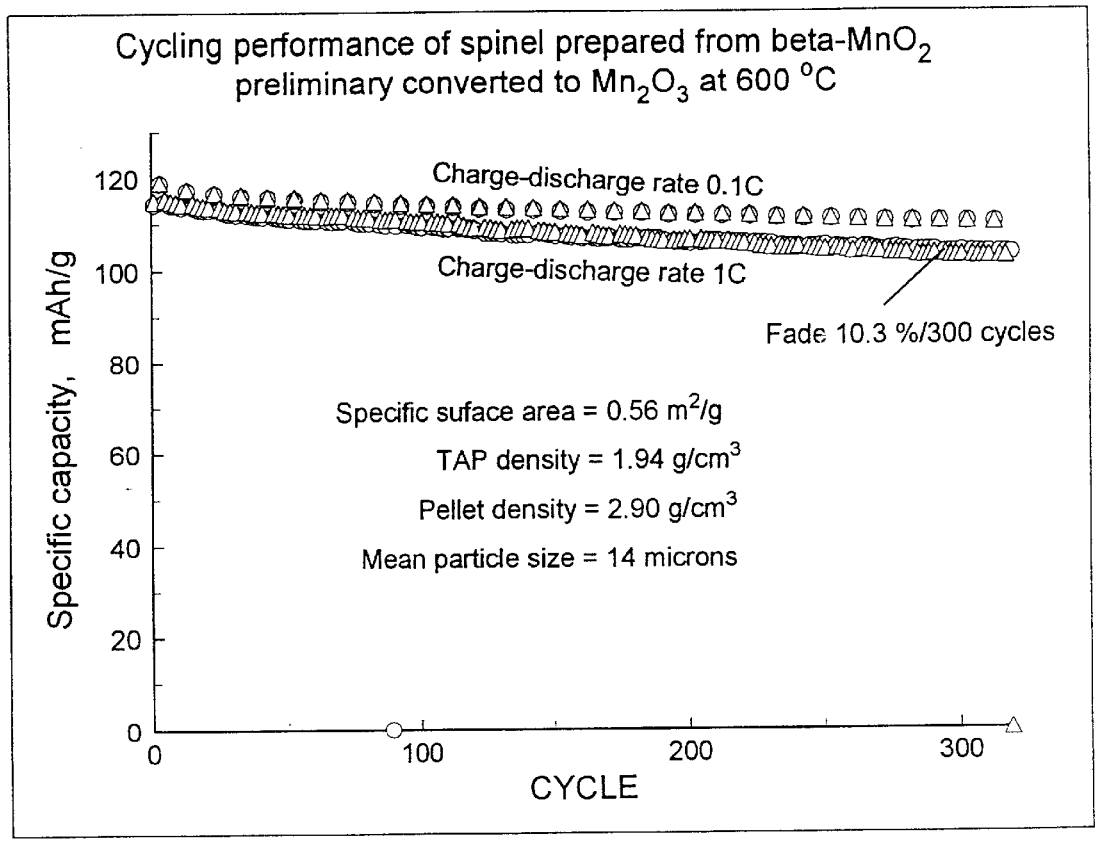
FIG. 6 is a graph of specific capacity v. charge-discharge cycles illustrating the cycling performance (i.e. specific capacity and cycleability) at 1 hour and 10 hour charge-discharge rates for $Li_{1.03}Mn_{1.96}CO_{0.01}O_4$ spinel compounds prepared according to the present invention from a $Mn_2O_3$ precursor converted from β-$MnO_2$ at 600° C.
Figure 7:
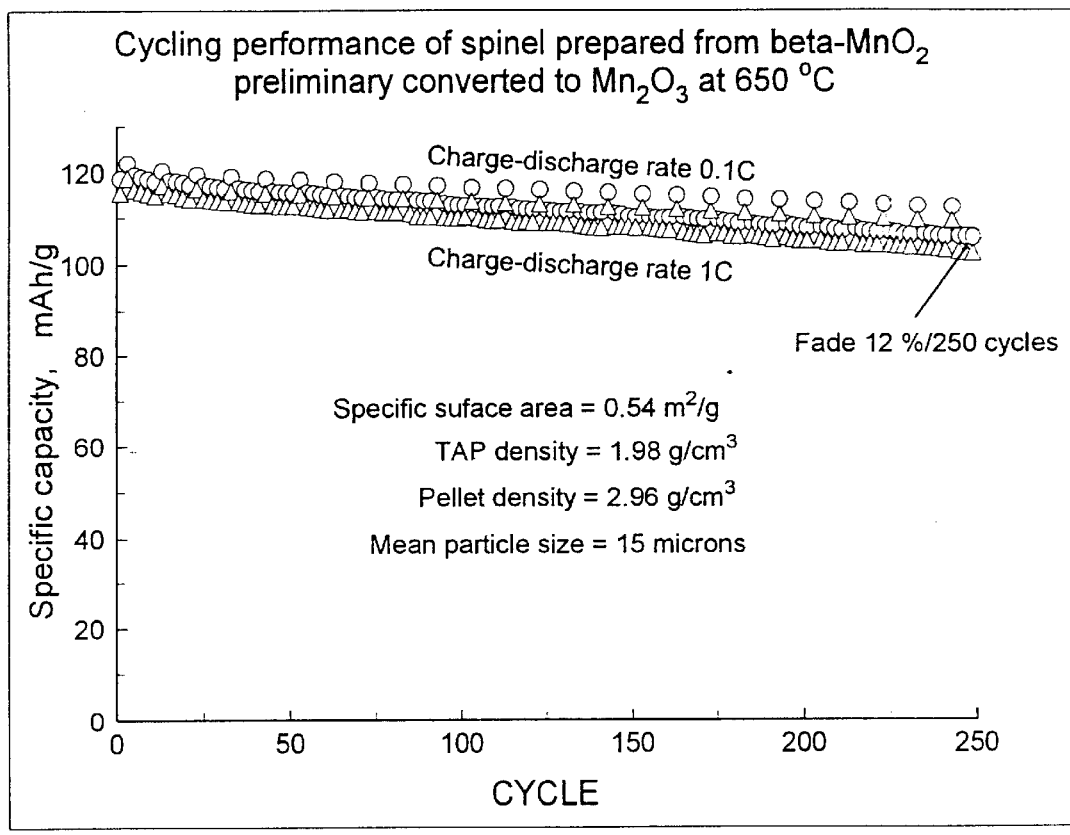
FIG. 7 is a graph of specific capacity v. charge-discharge cycles illustrating the cycling performance (i.e. specific capacity and cycleability) at 1 hour and 10 hour charge-discharge rates for $Li_{1.03}Mn_{1.96}CO_{0.01}O_4$ spinel compounds prepared according to the present invention from a $Mn_2O_3$ precursor converted from β-$MnO_2$ at 650° C.

In addition to the advantageous physical characteristics of the spinel compounds of the invention, these compounds also exhibit superior electrical performance. Specific capacities and cycleabilities for these compounds are illustrated in FIGS. 6 and 7.

In particular, these compounds have a capacity fade at room temperature between cycles 1–50 of preferably less than about 12%, and more preferably less than about 10%. Moreover, the capacity fade at room temperature for the compounds of the present invention between cycles 100–200 is preferably less than about 6%, more preferably less than about 5%.

The lithium manganese oxide spinel compounds of the invention possess the properties desired in the art including a desired metal oxide composition, structure, density and electrochemical performance. The spinel compounds prepared according to the present invention also have high tap and pellet densities. In addition, these spinel compounds have a predetermined mean particle size, particle size distribution, and high gravimetric specific energy. These spinel compounds can be used in the positive electrodes of secondary lithium and lithium ion cells to provide cells having high specific energy, safety cell performance, low manganese dissolution, low capacity fade during cycling and low capacity loss during storage at room and elevated temperatures.

It is understood that upon reading the above description of the present invention and reviewing the accompanying drawings, one skilled in the art could make changes and variations therefrom. These changes and variations are included in the spirit and scope of the following appended claims.

That which is claimed:

1. A lithium manganese oxide with a spinel structure and having the formula:

$$Li_{1+X}Mn_{2-Y}M^1_{m_1}M^2_{m_2}\ldots M^k_{m_k}O_{4+Z}$$

wherein:

M¹, M², . . . M^k are rations different than lithium or manganese selected from the group consisting of alkaline earth metals, transition metals, B, Al, Si, Ga and Ge;

X, Y, m₁, m₂, . . . m_k, each have a value greater than or equal to 0 and less than or equal to 0.2;

Z has a value greater than or equal to –0.1 and less than or equal to 0.2; and

X, Y, m₁, m₂, . . . m_k are selected to satisfy the equation:

$$Y=X+m_1+m_2+\ldots+m_k$$

and wherein the pore volume of pores having a mean radius of less than 1 micron in said lithium manganese oxide is no more than 20% of the total pore volume of said lithium manganese oxide.

2. The spinel compound according to claim 1 wherein the pore volume of pores having a mean radius of less than 1 micron is no more than 15% of the total pore volume of said lithium manganese oxide.

3. The spinel compound according to claim 1 wherein the pore volume of pores having a mean radius of less than 1 micron is no more than 10% of the total pore volume of said lithium manganese oxide.

4. The spinel compound according to claim 1 wherein the pellet density is greater than 2.85 g/cm³.

5. The spinel compound according to claim 1 wherein the pellet density is greater than 2.90 g/cm³.

6. The spinel compound according to claim 1 wherein the pellet density is greater than 2.95 g/cm³.

7. The spinel compound according to claim 1 wherein the tap density is greater than 1.9 g/cm³.

8. The spinel compound according to claim 1 wherein the tap density is greater than 2.1 g/cm³.

9. The spinel compound according to claim 1 wherein the specific area is less than 0.8 m²/g.

10. The spinel compound according to claim 1 wherein the specific area is less than 0.6 m²/g.

11. The spinel compound according to claim 1 wherein the specific area is less than 0.5 m²/g.

12. The spinel compound according to claim 1 wherein said cations M¹, M², . . . , M^k include cobalt.

13. A lithium manganese oxide with a spinel structure and having the formula:

$$Li_{1+X}Mn_{2-Y}M^1_{m_1}M^2_{m_2}\ldots M^k_{m_k}O_{4+Z}$$

wherein:

M₁, M², . . . M^k are cations different than lithium or manganese selected from the group consisting of alkaline earth metals, transition metals, B, Al, Si, Ga and Ge;

X, Y, m₁, m₂, . . . m_k, each have a value greater than or equal to 0 and less than or equal to 0.2;

Z has a value greater than or equal to –0.1 and less than or equal to 0.2; and

X, Y, m₁, m₂, . . . m_k are selected to satisfy the equation:

$$Y=X+m_1+m_2+\ldots+m_k$$

and wherein the tap density is greater than 1.9 g/cm³, the pellet density is greater than about 2.85 g/cm³, the specifilc area is less than 0.8 m²/g, and the full width at half maximum of x-ray diffraction peaks from planes (400) and (440) using CuaKα rays is less than about 0.15°-theta.

14. The spinel compound according to claim 13, wherein the tap density is greater than 2.1 g/cm³.

15. The spinel compound according to claim 13, wherein the specific area is less than 0.6m²/g.

16. The spinel compound according to claim 13, wherein the specific area is less than 0.5 m²/g.

17. The spinel compound according to claim 13 wherein the full width at half maximum of x-ray diffraction peaks from planes (400) and (440) using CuKα rays is less than about 0.125° 2θ.

* * * * *

UNITED STATES PATENT AND TRADEMARK OFFICE
CERTIFICATE OF CORRECTION

PATENT NO. : 6,267,943 B1
DATED : July 31, 2001
INVENTOR(S) : Manev et al.

It is certified that error appears in the above-identified patent and that said Letters Patent is hereby corrected as shown below:

Title page,
Item [56], References Cited, OTHER PUBLICATIONS: "(0<x>2)" should read -- (0<x<2) --; after "LiMnO$_2$" insert -- in the α-NaFeO$_2$ --.
In the references Hernan et al., "Tr" should read -- Ti --.

Column 7,
Line 52, "rations" should read -- cations --;
Line 57, "0and" should read -- 0 and --.

Column 8,
In the formula, line 33, cancel the period under "O";
Line 36, "M$_1$" should read -- M$^1$ --;
Line 53, "CuaKα" should read -- CuKα --; "0.15°-theta" should read -- 0.15°2-theta --.

Signed and Sealed this

Thirty-first Day of December, 2002

JAMES E. ROGAN
*Director of the United States Patent and Trademark Office*